US008301781B1

United States Patent
Ludwig et al.

(10) Patent No.: US 8,301,781 B1
(45) Date of Patent: Oct. 30, 2012

(54) METHODS AND SYSTEMS FOR BROWSER FILE TRANSFER

(75) Inventors: Scott Ludwig, Bellevue, WA (US); Erik Arjan Hendriks, Kirkland, WA (US)

(73) Assignee: Google Inc., Mountain View, CA (US)

( * ) Notice: Subject to any disclaimer, the term of this patent is extended or adjusted under 35 U.S.C. 154(b) by 220 days.

(21) Appl. No.: 12/259,894

(22) Filed: Oct. 28, 2008

Related U.S. Application Data (60) Provisional application No. 61/000,899, filed on Oct. 30, 2007.

(51) Int. Cl.
*G06F 15/16* (2006.01)
(52) U.S. Cl. ........................... 709/227; 709/206
(58) Field of Classification Search ................... 709/206, 709/227
See application file for complete search history.

(56) References Cited

U.S. PATENT DOCUMENTS

| | | | |
|---|---|---|---|
| 5,956,487 A * | 9/1999 | Venkatraman et al. ....... | 709/218 |
| 6,182,116 B1 * | 1/2001 | Namma et al. ................ | 709/204 |
| 6,370,580 B2 | 4/2002 | Kriegsman | |
| 6,463,418 B1 | 10/2002 | Todd | |
| 6,754,621 B1 * | 6/2004 | Cunningham et al. ........ | 704/219 |
| 6,785,708 B1 * | 8/2004 | Busey et al. .................. | 709/204 |
| 7,003,799 B2 * | 2/2006 | Jorgenson ..................... | 726/12 |
| 7,305,546 B1 * | 12/2007 | Miller ........................... | 713/153 |
| 2004/0148434 A1 * | 7/2004 | Matsubara et al. ........... | 709/246 |
| 2005/0209927 A1 * | 9/2005 | Aaltonen et al. .............. | 705/26 |
| 2005/0229243 A1 * | 10/2005 | Svendsen et al. ............. | 726/12 |
| 2006/0168260 A1 * | 7/2006 | Hinde et al. .................. | 709/229 |
| 2006/0230153 A1 * | 10/2006 | Li .................................. | 709/227 |
| 2007/0016680 A1 * | 1/2007 | Burd et al. .................... | 709/227 |
| 2007/0032991 A1 * | 2/2007 | Bingham et al. .............. | 702/189 |
| 2007/0033588 A1 * | 2/2007 | Landsman .................... | 717/178 |
| 2007/0094279 A1 * | 4/2007 | Mittal et al. .................. | 707/100 |
| 2007/0168490 A1 * | 7/2007 | Kent et al. .................... | 709/223 |
| 2007/0282963 A1 * | 12/2007 | Mo et al. ....................... | 709/207 |
| 2007/0294333 A1 * | 12/2007 | Yang et al. .................... | 709/203 |
| 2009/0132713 A1 * | 5/2009 | Dutta et al. ................... | 709/227 |
| 2009/0164639 A1 * | 6/2009 | Sylvain ......................... | 709/227 |
| 2010/0042677 A1 * | 2/2010 | Ishikawa ....................... | 709/203 |

OTHER PUBLICATIONS

PipeBytes. "PipeBytes." http://pipebytes.com accessed Aug. 27, 2010. p. 1.*
Bennet, "Beehive Expands Sendfile.NET to Include Universal Browser-Based File Transfer Services," Published in Mar. 2000; Downloaded from http://www.thebeehive.com/PRgetfile.html on Jan. 26, 2009; 2 Pages.
Vetter et al., "Mosaic and the World-Wide Web," *IEEE Computer*, Oct. 1994; pp. 49-57.

* cited by examiner

*Primary Examiner* — Imad Hussain
(74) *Attorney, Agent, or Firm* — Sterne, Kessler, Goldstein & Fox PLLC (57) ABSTRACT

The present invention relates to transferring files between browsers and other browsers or peer-to-peer (P2P) clients. In an embodiment, a system for transferring files includes a first browser and a second browser. The system may have a first client coupled to the first browser and a second client coupled to the second browser. The system may have a relay server coupled to the first and second clients configured to receive data from the first client, send the data to the second client, and send an acknowledgement to the first client upon completion.

10 Claims, 5 Drawing Sheets

METHODS AND SYSTEMS FOR BROWSER FILE TRANSFER

This application claims the benefit of U.S. Provisional Appl. No. 61/000,899, filed Oct. 30, 2007 and incorporated by reference herein in its entirety.

BACKGROUND OF THE INVENTION

1. Field of the Invention

The present invention relates to web communication and file transfer.

2. Background Art

The emergence and development of computer networks and protocols, including the Internet, now allows many remote users to transfer files to one another. Different types of file transfer tools have been developed for the Internet which allow users to transfer files in different ways. Some file transfer applications that have been developed include peer-to-peer (P2P) networks and email attachments via "multipurpose internet mail extensions" (MIME), for example.

One sector of Internet development that has been especially rigorous is the World Wide Web (or simply "web"). Web browsing applications enable users to display or interact with text, images, or other content located on web pages at websites on the World Wide Web, a local area network, or other network. Browsers use "hypertext transfer protocol" (HTTP) or similar communication protocols, including encrypted transfer protocols such as SHTTP. Internet users increasingly spend more time on the web versus other sectors of the Internet. Different types of communication tools have been developed for the web that allow users to send and receive information in different ways. HTTP is a well established and very reliable conduit for transferring information over the Internet. Consequently, information providers have utilized HTTP to deliver an ever increasing diversity of content to Internet users. For example, the web provides a convenient place for users to get news, send and receive emails, and enjoy entertainment such as video, audio, or similar media. However, one area where web tool development has lagged behind these examples is in file transfer between users.

Another sector of the Internet where users are spending more time is instant messaging (IM). Users have grown accustomed to sharing the web experience with other users instantly. Some stand alone IM applications have incorporated file transfer tools that may allow a file to be attached to an instant message communication. However, a user of these tools would need to download a client IM application separate from a browser. Similarly, P2P network applications typically operate outside of the browser environment. In addition, the P2P framework is a unilateral approach to file transfer. In other words, only one of the end nodes of a file transfer (a sender) initiates the transfer. This is not conducive to the evolving web environment where users are instantaneously sharing their web experience. Similarly, MIME and other email attachment approaches to file transfer fail to cure this deficiency. Conversely, email attachments add additional problems. Email attachments require that a file be fully uploaded before a receiver can begin downloading. This can take a long time for people sending large files with slow links. Also, email attachments require a server to temporarily store the file until the receiver can retrieve it, this usually results in an arbitrary limit on how large the file can be.

Users need a reliable, bilateral way of transferring files between a browser and other browsers or peer-to-peer (P2P) clients without a client application download. Additionally, users need a solution for this transfer that does not place a limit on the size of the file nor require the size of the file to be known.

BRIEF SUMMARY OF THE INVENTION

The present invention relates to transferring files between browsers and other browsers or peer-to-peer (P2P) clients. In an embodiment, a system for transferring files includes a first browser and a second browser. The system includes a first client coupled to the first browser and a second client coupled to the second browser. The system includes a relay server coupled to the first and second clients configured to receive data for a file being transferred from the first client and send the data to the second client.

In an embodiment, a system for transferring files includes a browser and a P2P engine. The system includes a first client coupled to the browser and a second client coupled to the P2P engine. The system includes a relay server coupled to the first and second clients configured to receive data for a file being transferred from the first client and send the data to the second client.

Further embodiments, features, and advantages of the invention, as well as the structure and operation of the various embodiments of the invention are described in detail below with reference to accompanying drawings.

BRIEF DESCRIPTION OF THE DRAWINGS

The present invention will be described with reference to the accompanying drawings, wherein like reference numbers indicate identical or functionally similar elements. Also, the leftmost digit(s) of the reference numbers identify the drawings in which the associated elements are first introduced.

DETAILED DESCRIPTION OF EMBODIMENTS OF THE INVENTION

The present invention relates to transferring files between browsers and other browsers or peer-to-peer (P2P) clients. While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which the invention would be of significant utility.

The term "browser" refers to a browsing application that enables a user to display or interact with text, images, or other content located on a Web page at a website on the World Wide Web, a local area network, or other network. For example, Web browsers include an INTERNET EXPLORER, MOZILLA FIREFOX, SAFARI, OPERA, or NETSCAPE browser.

The term "P2P" refers to a peer-to-peer network used to connect nodes via largely ad hoc connections. These nodes are referred to in this document as peers or peer clients. Such networks are useful for many purposes, such as sharing content files containing audio, video, data or anything in digital format, as well as realtime data, such as telephony traffic.

The term "B2B" refers to a browser-to-browser communication system. Similar to P2P terminology, nodes are referred to in this document as browsers.

The term "B2P" refers to refers to a browser-to-peer communication system. The nodes of B2P networks include both peers and browsers. A B2P network may communicate via client-server protocol and communication protocol request methods as described above.

This detailed description of embodiments of the present invention is divided into several sections. First, file transfer in a B2B network according to an embodiment of the present invention is described with reference to FIG. 1. Second, file transfer in a B2P network according to an embodiment of the present invention is described with reference to FIG. 2. Third, methods for file transfer in B2B and B2P networks according to an embodiment of the present invention is described with reference to FIGS. 3-5.

File Transfer Systems

Figure 1:
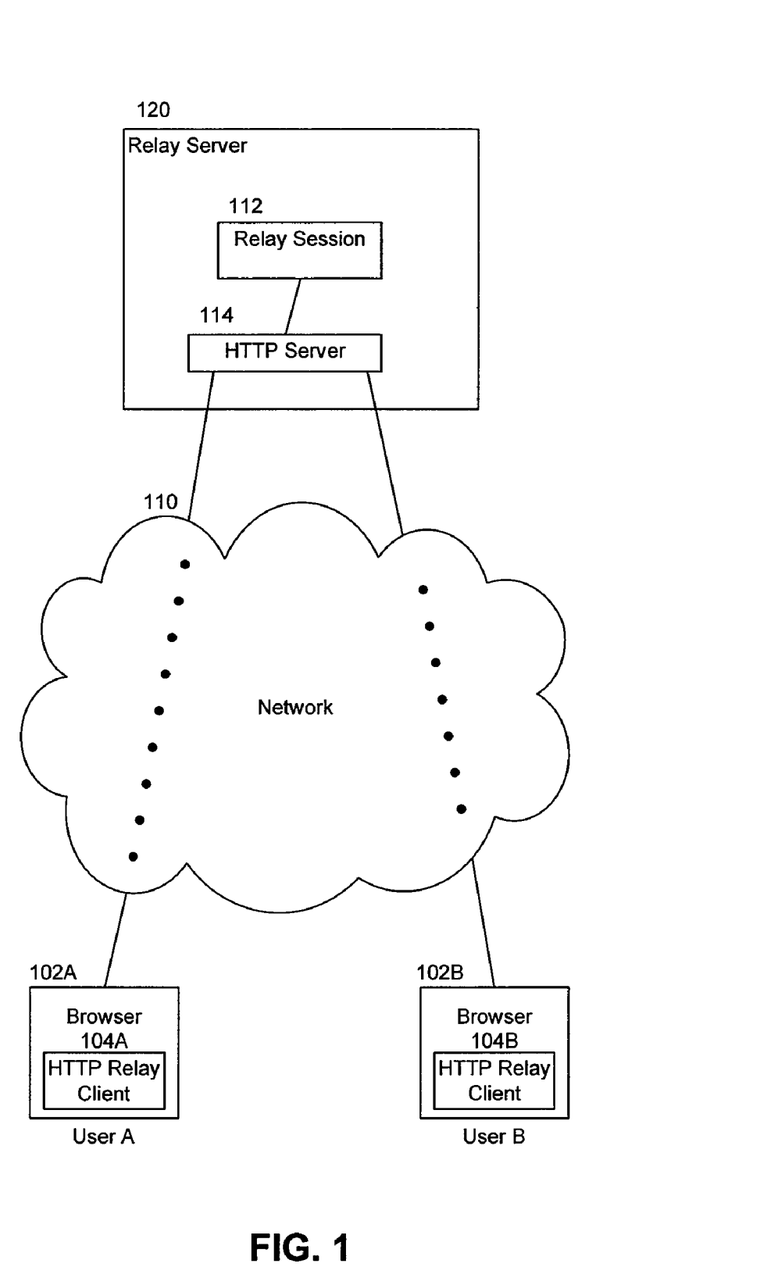
FIG. 1 is a diagram of an exemplary system for providing file transfer capabilities between browsers according to an embodiment of the present invention.

FIG. 1 is a diagram of a B2B system 100 for providing file transfer capabilities between two users A and B according to an embodiment of the present invention. Although B2B system 100 is described herein with reference to two users, one of skill in the art will recognize that B2B system 100 may also be utilized to provide file transfer capabilities between any number of users without departing from the spirit and scope of the present invention. B2B system 100 includes browser 102A coupled to relay server 120 over one or more networks 110. Browser 102A includes HTTP relay client 104A associated with user A. B2B system 100 also includes browser 102B coupled to relay server 120. Browser 102B includes HTTP relay client 104B associated with user B. Although B2B system 100 is described as using HTTP, other communication protocols are envisioned and can be used, including but not limited to encrypted transfer protocols such as SHTTP. A communication protocol is a convention or standard that controls or enables the connection, communication, or data transfer between two computing endpoints.

Relay server 120 includes HTTP server 114 and relay session 112. However, a single relay server 120 may have multiple HTTP servers 114 and multiple relay sessions 112. Relay server 120 may utilize various other networked components to support communication between users A and B. For example, relay server 120 may use HTTP server 114 to transfer events or data between users A and B. As will be described in further detail below.

Figure 2:
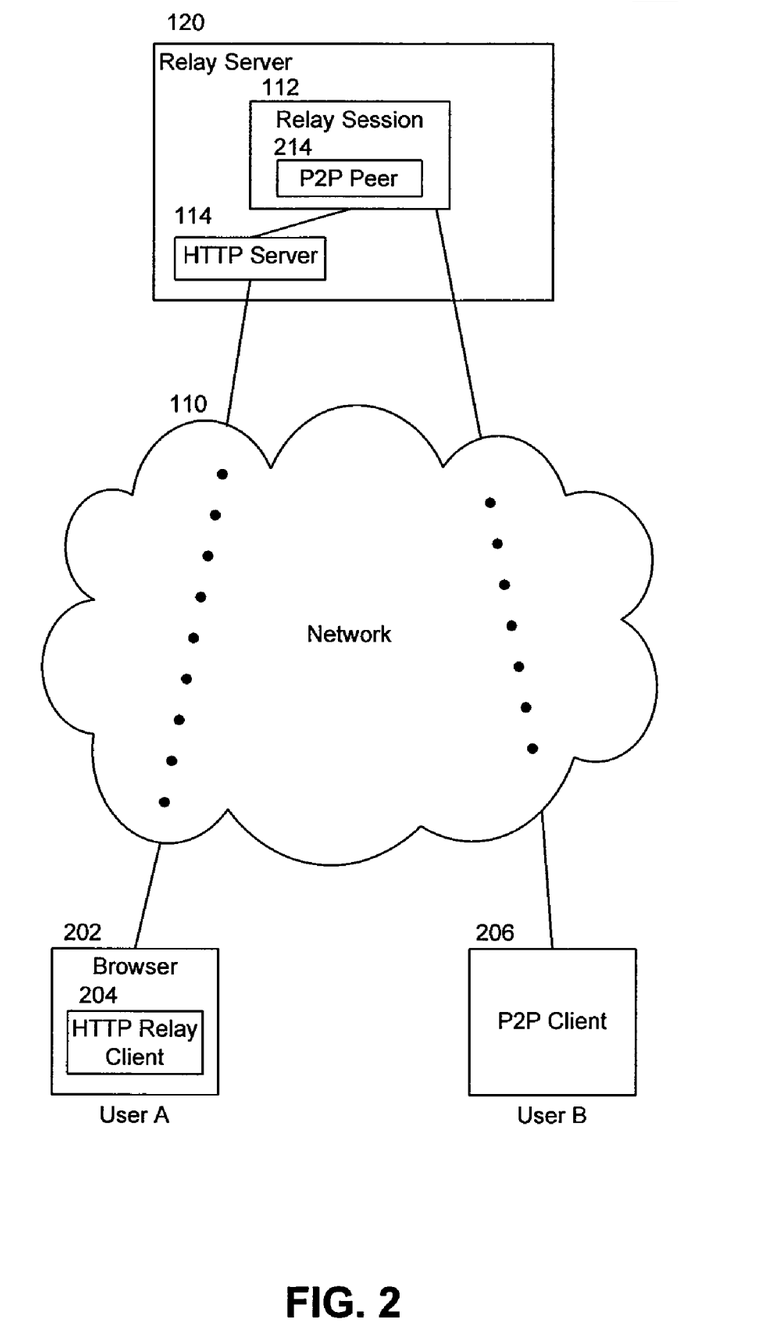
FIG. 2 is a diagram of an exemplary system for providing file transfer capabilities between a browser and a P2P client according to an embodiment of the present invention.

FIG. 2 is a diagram of a B2P system 200 for providing file transfer capabilities between two users A and B according to another embodiment of the present invention. Although B2P system 200 is described herein with reference to two users, one of skill in the art will recognize that B2P system 200 may also be utilized to provide file transfer capabilities between any number of users without departing from the spirit and scope of the present invention. Similarly to B2B system 100, B2P system 200 includes browser 202 coupled to relay server 120 over one or more networks 110. Browser 202 includes HTTP relay client 204 associated with user A. B2P system 200 also includes P2P client 206 associated with user B coupled to relay server 120 over one or more networks 110.

In an embodiment, relay server 120 includes relay session 112. However, a single relay server 120 may have multiple HTTP servers 114 and multiple relay sessions 112. Relay session 112 includes P2P peer 214. Relay session 112 may utilize various other networked components to support communication between users A and B, similarly to B2B system 100. For example, relay server 120 may use HTTP server 114 and P2P peer 214 to transfer events or data between users A and B. By using HTTP server 113 and P2P peer 214, relay session 214 can relay information from an HTTP node to a P2P node or from a P2P node to an HTTP node. This process will be described in further detail below.

Network 110 can be any network or combination of networks that can carry data communication, and may be referred to herein as a computer network. Such network 110 can include, but is not limited to, a local area network, medium area network, and/or wide area network such as the Internet. Network 110 can support protocols and technology including, but not limited to, World Wide Web protocols and/or services. Intermediate web servers, gateways, or other servers may be provided between components of system 100 depending upon a particular application or environment.

Client browsers 102A, 102B, 202, HTTP relay clients 104A, 104B, 204, and P2P client 206 can be implemented in software, firmware, hardware, or any combination thereof. Client browsers 102A, 102B, 202, HTTP relay clients 104A, 104B, 204, and P2P client 206 can be implemented to run on any type of processing device including, but not limited to, a computer, workstation, distributed computing system, embedded system, stand-alone electronic device, networked device, mobile device, set-top box, television, or other type of processor or computer system. Such a processing device implementing a client browser and/or an HTTP relay client may be referred to herein as a remote client device. Client browsers 102A, 102B, 202, HTTP relay clients 104A, 104B, 204, and P2P client 206 can also be used in a variety of applications in combination with file transferring, or in file transferring alone.

Similarly, relay session 112, HTTP server 114, relay server 120 and P2P peer 214 can be implemented in software, firmware, hardware, or any combination thereof. Relay session 112, HTTP server 114, relay server 120 and P2P peer 214 can be implemented to run on any type of processing device including, but not limited to, a computer, workstation, distributed computing system, embedded system, stand-alone electronic device, networked device, mobile device, set-top box, television, or other type of processor or computer system. Relay session 112, HTTP server 114, relay server 120 and P2P peer 214 can also be used in a variety of applications in combination with file transferring, or in file transferring alone.

B2B system 100 and B2P system 200 can be used as a stand-alone system or in connection with a search engine, web portal, or other web site to allow two or more remote users to engage in file transferring. Relay session 112, HTTP server 114, relay server 120 and P2P peer 214 can operate alone or in tandem with other servers, web servers, or devices and can be part of any search engine, portal, or web site.

Functionality described herein is described with respect to components or modules for clarity. However, this is not intended to be limiting, as functionality can be implemented on one or more modules on one device or distributed across multiple devices.

In operation of B2B system 100, relay session 112 manages the overall communication between HTTP relay clients 104A and 104B. When users A wishes to transfer a file to user B, HTTP relay client 104A provides user A with an interface that includes the ability to choose a file to be transferred. In addition, HTTP relay client 104B provides user B with an interface that includes the ability to accept the file and optionally provide a destination to save the file. HTTP relay clients 104A and 104B can provide the opposite interfaces in the case where user B wishes to transfer a file to user A. Any type of user interface can be used that allows a user to input or select a file name or link to a file through the user interface to identify a file for transfer by HTTP relay clients 104A and 104B. Similarly, any type of user interface can be used that allows a user to accept a file and provide a destination to save a file through the user interface that is received by HTTP relay clients 104A and 104B. For example, any kind of link, button, selector, or other type of user interface control element may be used. In this way, a file can be transferred without requiring user A or B to minimize, close, or otherwise deviate from browser 102A or 102B, respectively.

Additionally, relay session 112 may provide transfer status to users A and B. For example, transfer status may include the total size of the file, the amount of data transferred, the completion percentage and the estimated time of the transfer. In B2B system 100, for example, users A and B can identify a file to be transferred and relay session 112 can connect HTTP relay clients 104A and 104B through HTTP server 114 to facilitate the file transfer.

Similarly, in operation of P2B system 200, relay session 112 manages the overall communication between HTTP relay clients 204 and P2P client 206. When users A and B wish to transfer a file, HTTP relay client 204 provides user A an interface that includes the ability to choose a file to be transferred. Similarly, P2P client 206 provides user B an interface that includes the ability to accept the file and optionally provide a destination to save the file. Any type of user interface can be used that allows a user to input or select a file name or link to a file through the user interface to identify a file for transfer by HTTP relay client 204. For example, any kind of link, button, selector, or other type of user interface control element may be used. In this way, a file can be transferred without requiring user A to minimize, close, or otherwise deviate from browser 202.

Additionally, relay session 112 may provide transfer status to user A. For example, transfer status may include the total size of the file, the amount of data transferred, the completion percentage and the estimated time of the transfer. In B2P system 200, for example, relay session 112 can connect HTTP relay client 204 and P2P client 206 through P2P peer 214 to facilitate the file transfer.

Additionally, relay server 120 can provide HTTP relay clients 104A, 104B, 204 and P2P client 206 a unique session ID associated with relay session 112. Additionally, relay server 120 can manage and store these session IDs. This prevents other users from erroneously or maliciously participating in the transfer between users A and B. In B2B system 100, HTTP clients 104A and 104B use the session ID to interface with relay session 112. In B2P system 200, HTTP client 204 uses the session ID to interface with relay session 112. In an embodiment, P2P peer 214 operates on behalf of HTTP client 204 and interfaces with P2P client 206 according to established P2P framework that is readily known in the art.

Example Process Flow

Figure 3:
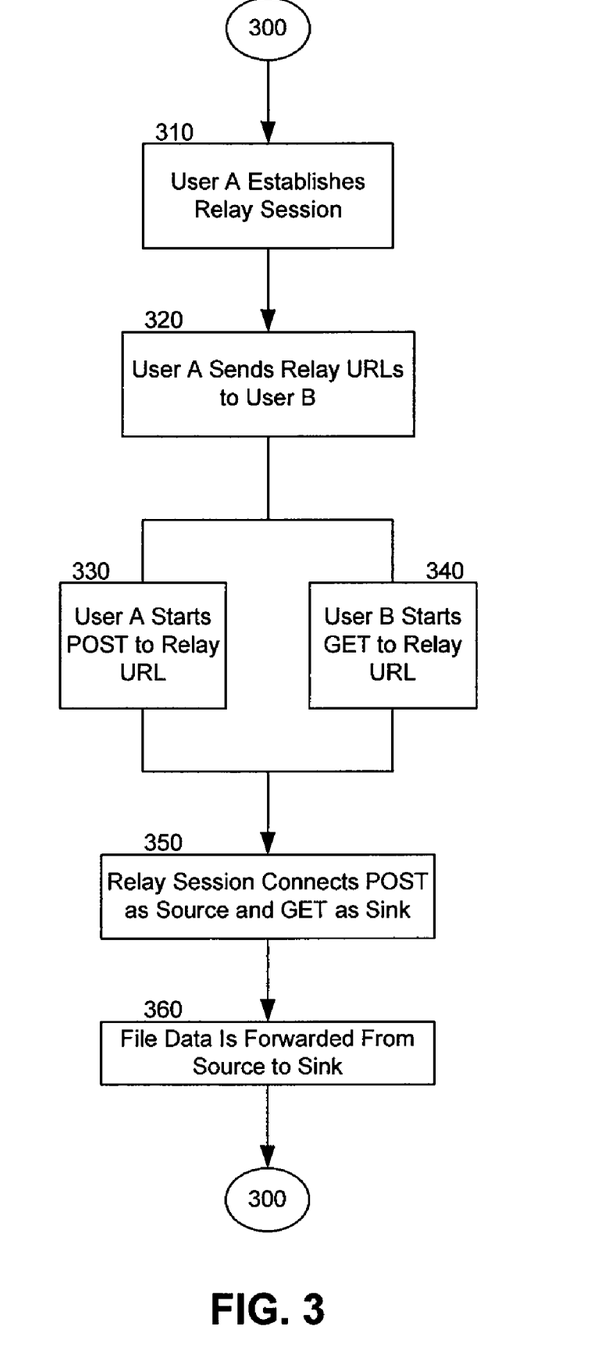
FIG. 3 is a flowchart of an exemplary routine for users to transfer files between browsers according to an embodiment of the present invention.
Figure 4:
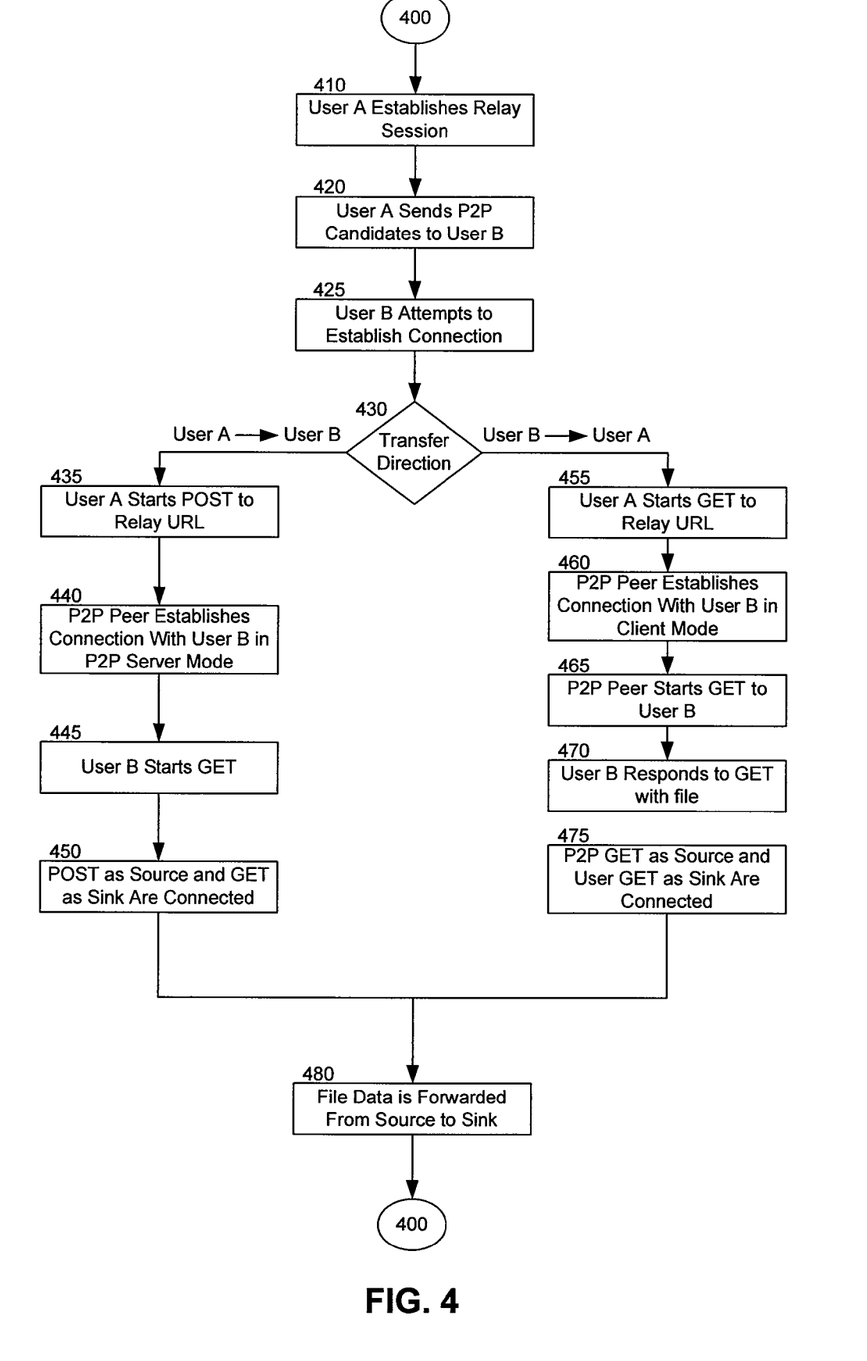
FIG. 4 is a flowchart of an exemplary routine for users to transfer files between a browser and a P2P client according to an embodiment of the present invention.
Figure 5:
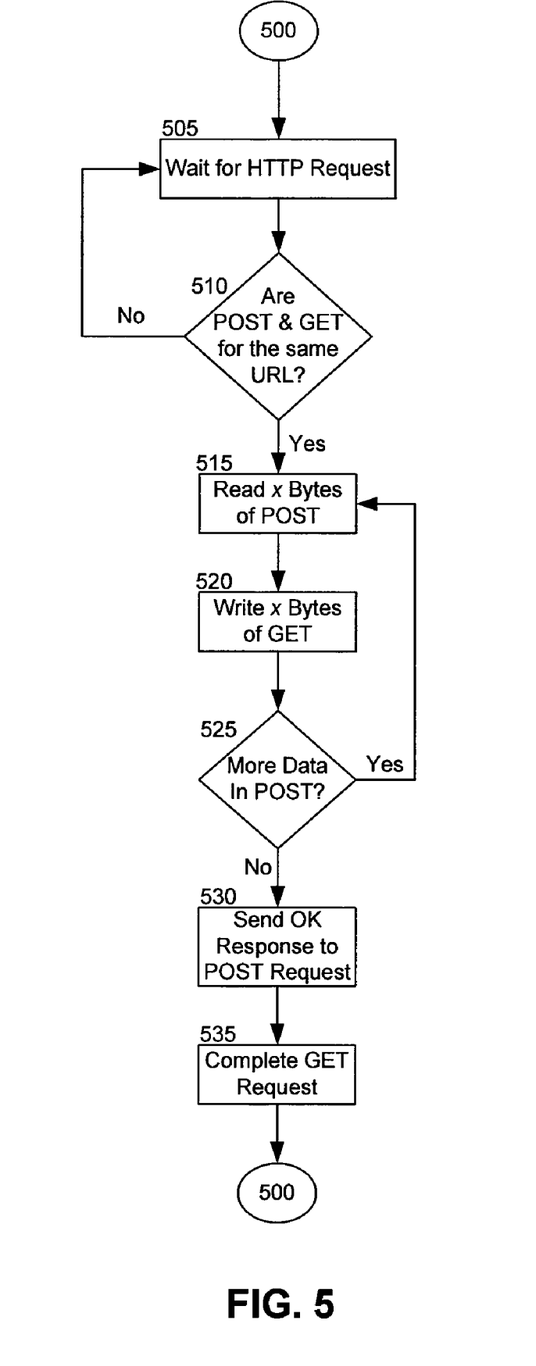
FIG. 5 is a flowchart of an exemplary routine for a server to receive and deliver files according to an embodiment of the present invention.

Embodiments and the operation of B2B system 100 and B2P system 200 are further described with respect to routines 300, 400 and 500 in FIGS. 3, 4 and 5. Routines 300, 400 and 500 will be described with reference to B2B system 100 and B2P system 200 but are not necessarily limited to the structure of B2B system 100 and B2P system 200.

FIG. 3 illustrates an exemplary routine 300 for transferring files between two users of browsers according to an embodiment of the present invention. In this example, user A operates HTTP relay client 104B and browser 102B, while user B operates HTTP relay client 104B and browser 102B. In step 310, user A establishes a relay session. Establishing the relay session yields a Uniform Resource Locator (URL) associated with the relay session, in this example relay session 112. The relay URL defines the location of relay session 112 and facilitates communication between users A and B and relay session 112. The relay URL includes an Internet protocol address (IP), a port as well as additional information. The relay URL, for example, may contain the session ID for the relay session. This provides relay server 120 with enough information to correctly determine if HTTP requests are associated with each other. The session ID may be assigned and stored by relay server 120.

In step 320, user A sends the relay URL to user B. This can be done in any fashion, for example, user A could send the relay URL via email, internet messaging or any other method of communicating. In step 330, User A starts a POST method to the relay URL. POST is an HTTP method for submitting data to an HTTP server, in this example HTTP server 114. In step 340, User B starts a GET method to the relay URL. GET is an HTTP method for retrieving data from an HTTP server, in this example HTTP server 114. Steps 330 and 340 can be performed in any order. For brevity, routine 300 depicts user A, the sender, establishing the relay session; however, user B, the receiver, may instead establish the relay session and send the relay URL to user A.

The POST in step 330 becomes a source and the GET in step 340 becomes a sink. In computing, a source is a class or function designed to send events or data to another object or function. In computing, a sink is a class or function designed to receive incoming events or data from another object or function. In step 350, relay session 112 connects the POST, as source, and the GET, as sink. Once the POST and GET are connected data can flow from user A to user B through relay session 112 and HTTP server 114. In step 360, the file is forwarded from user A to user B in chunks as they are received. Chunks can be any size of data including but not limited to bits, bytes, words, or similar divisions of data. This process is described in greater detail below in relation to FIG. 5.

FIG. 4 illustrates an exemplary routine 400 for transferring files between a user of a browser and a user of a P2P client according to an embodiment of the present invention. In this example, user A operates HTTP relay client 204 and browser 202, while user B operates P2P client 206. In step 410, user A establishes a relay session. Establishing the relay session yields a Uniform Resource Locator (URL) associated with the relay session. This relay URL is similar to that produced in step 310 as described above. In addition to the relay URL, establishing the relay session also yields P2P candidates. The relay URL defines the location of relay session 112 and facilitates communication between user A and relay session 112. Similarly, the P2P candidates facilitate communication between user B and relay session 112 through P2P peer 214.

In step 420, user A sends the P2P candidates to user B. This can be done in any fashion, for example, user A could send the P2P candidates via email, internet messaging or any other method of communicating. In step 425, user B uses the P2P candidates to attempt to establish a connection with P2P peer 214.

The following steps differ depending on which direction the transfer will flow in, step 430. If user A is the sender, in step 435, user A would start a POST method to the relay URL. In step 440, P2P peer 214 establishes a connection with user B in P2P server mode. In step 445, once the P2P connection is established, user B starts a GET request over the P2P connection. The POST in step 435 becomes a source and the GET in step 445 becomes a sink. In step 450, relay session 112 connects the POST, as source, and the GET, as sink. Once the source and sink are connected data can flow from user A to user B through relay session 112 and P2P peer 214. In step 480, the file is forwarded from user A to user B in chunks as it is received. Chunks can be any size of data including but not limited to bits, bytes, words, or similar divisions of data.

If user B is the sender, in step 455, user A would start a GET method to the relay URL. In step 460, P2P peer 214 establishes a connection with user B as a P2P client. In step 465, once the P2P connection is established, P2P peer 214, acting in client mode, starts a GET method to user B. In step 470, as a response to the GET request, user B sends the file to be transferred to P2P peer 214. The P2P GET in step 465 becomes a source and the user GET in step 455 becomes a sink. In step 475, relay session 112 connects the P2P GET, as source, and the user GET, as sink. Once the source and sink are connected data can flow from user B to user A through relay session 112 and P2P peer 214. In step 480, the file is forwarded from user B to user A in chunks as it is received.

FIG. 5 illustrates an exemplary routine 500 for facilitating file transfer between users through relay session 112 according to an embodiment of the present invention. For brevity, routine 500 is described as being performed by relay session 112. However, alternatively, the operations of routine 500 may be performed by HTTP server 114 and/or P2P peer 214. In step 505, relay session 112 waits for an HTTP request (i.e. a GET or POST). For example, an HTTP request such as the requests in FIGS. 3 and 4 steps 330, 340, 435, 445, 450 and 460.

In step 510, relay session 112 compares the POST and GET to see if both requests are for the same URL. If the requests are not for the same URL, relay session 112 repeats step 505 and waits for an HTTP request. If the requests are for the same URL, relay session 112 reads x bytes of the POST request. Although this routine refers to x as one or more bytes, x can be any size of data including, but not limited to, data of a size less than a byte. In step 520 relay session 112 writes x bytes of the GET.

In step 525, relay session 112 checks to see if there is more data in the POST. If there is more data in the POST, relay session 112 repeats steps 515-525 until all the data of the POST has been written to the GET. In step 530, relay session 112 sends an OK response to the POST request. The OK response behaves like a return receipt or acknowledgement. This acknowledgement indicates to the sender that the file was successfully sent to the client. In step 535, relay session 112 completes the GET request.

Embodiments have been described above primarily with respect to web technology; however, the invention is not necessarily limited to the Web and can be used in other environments as would be apparent to person skilled in the art given this description. For instance, HTTP relay clients 104A, 104B and 204 can be run without use of browsers 102A, 102B and 202, and relay server 120 may be run without use of a web server.

CONCLUSION

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A system for transferring a file between a first browser and a second browser comprising:
    a first client, coupled to the first browser on a first processing device, that divides the file into chunks of data;
    a second client coupled to the second browser on a second processing device; and
    a relay server, coupled to the first and second clients, that:
        (i) receives a first HTTP request from the first browser, the first HTTP request being an HTTP POST request,
        (ii) receives a second HTTP request from the second browser, the second HTTP request being an HTTP GET request, and
        (iii) for each of the first and second HTTP requests, determines that the HTTP request is to send the file or to receive the file based on whether the HTTP request is an HTTP POST request or an HTTP GET request respectively such that the relay server determines whether to send or receive data for the file in response to an HTTP request depending on the type of HTTP request method used,
    wherein the first HTTP request is addressed to a first resource locator and the second HTTP request is addressed to a second resource locator, and the relay server determines whether the first and second HTTP requests are associated with each other based on the first and second resource locators; and
    wherein the relay server receives the chunks of data from the first client and sends the chunks of data to the second client as the chunks of data are received.

2. The system of claim 1, wherein the relay server further sends an acknowledgement to the first client upon completion of the file transfer.

3. The system of claim 1, wherein the relay server is connected to the first client as a data source and connected to the second client as a data sink.

4. The system of claim 1, wherein the first resource locator includes a session ID associated with the relay session, and second resource locator also includes the session ID.

5. The system of claim 4, wherein the first resource locator is the same as the second resource locator.

6. A method for transmitting a file between a first browser and a second browser comprising:
    (a) establishing a relay session on a relay server;

(b) receiving, at the relay server, a first HTTP request from the first browser, the first HTTP request being an HTTP POST request addressed to a first resource locator;

(c) receiving, at the relay server, a second HTTP request from the second browser, the second HTTP request being an HTTP GET request addressed to a second resource locator;

(d) determining whether the first and second HTTP requests are associated with each other based on the first and second resource locators; and (e) for each of the first and second HTTP requests, determining that the HTTP request is to send the file or to receive the file based whether the HTTP request is an HTTP POST request or an HTTP GET request respectively;

(f) determining whether to send or receive data for the file based on the type of HTTP request method received;

(g) receiving, as part of the first HTTP request, the file divided into chunks of data from the first browser via one or more networks; and (h) sending, as a response to the second HTTP request, the chunks of data received from the first browser to the second browser as the chunks of data are received.

7. The method of claim 6, further comprising (g) sending, as a response to the first HTTP request, an acknowledgement to the first browser upon completion of the file transfer.

8. The method of claim 6, further comprising (g) sending information defining a location of the relay session to the second browser to establish a connection to the second browser.

9. The method of claim 6, wherein the establishing (a) comprises determining a session ID for the relay session, and wherein the first and second resource locators each include the session ID.

10. The method of claim 9, wherein the first resource locator is the same as the second resource locator.

* * * * *